United States Patent
Witt et al.

(10) Patent No.: US 6,707,973 B2
(45) Date of Patent: Mar. 16, 2004

(54) BUFFER TUBE DESIGN FOR EASY AND RELIABLE ACCESS IN MID-SPAN

(75) Inventors: Geoff Witt, Hickory, NC (US); Brian Risch, Hickory, NC (US)

(73) Assignee: Alcatel, Paris (FR)

( * ) Notice: Subject to any disclaimer, the term of this patent is extended or adjusted under 35 U.S.C. 154(b) by 180 days.

(21) Appl. No.: 09/985,398

(22) Filed: Nov. 2, 2001

(65) Prior Publication Data

US 2003/0099446 A1 May 29, 2003

(51) Int. Cl.[7] ................................................. G02B 6/44
(52) U.S. Cl. ....................................... 385/109; 385/110
(58) Field of Search ............................... 385/109, 100, 385/113; 30/90.8

(56) References Cited

U.S. PATENT DOCUMENTS

| | | | |
|---|---|---|---|
| 4,664,472 A | 5/1987 | Mayr et al. | |
| 4,726,649 A | * 2/1988 | Funaki et al. | ............... 385/109 |
| 4,983,333 A | 1/1991 | Blew | |
| 5,031,996 A | * 7/1991 | Saller et al. | ................. 385/109 |
| 5,201,020 A | 4/1993 | Kannabiran | |
| 5,355,472 A | 10/1994 | Lewis | |
| 5,408,561 A | 4/1995 | McCallum, III et al. | |
| 5,443,536 A | 8/1995 | Kiritsy et al. | |
| 5,761,362 A | 6/1998 | Yang et al. | |
| 5,911,023 A | 6/1999 | Risch et al. | |
| 6,023,844 A | 2/2000 | Hinson, II et al. | |

FOREIGN PATENT DOCUMENTS

EP        0 336 806 A2     10/1989

* cited by examiner

Primary Examiner—Chandrika Prasad
(74) Attorney, Agent, or Firm—Sughrue Mion, PLLC

(57) ABSTRACT

The present invention is directed to a novel construction of buffer tubes for fiber optic cables which offers a way to access the optical fibers inside a buffer tube while reducing the risk of damaging the fibers, as sometimes occurs when cutting the outer layer of the buffer tube. A buffer tube for use in a fiber optic cable of the present invention comprises a tube having a tube wall, the wall having an inside and outside surface, wherein an inner portion of tube wall, nearest the inside surface, is made of a material having a higher notch-sensitivity than an outer portion of the tube wall nearest the outside surface.

17 Claims, 2 Drawing Sheets

BUFFER TUBE DESIGN FOR EASY AND RELIABLE ACCESS IN MID-SPAN

BACKGROUND

The present invention relates generally to the field of fiber optic cables. In particular, the present invention is directed to a novel construction of buffer tubes for fiber optic cables which offers a way to access the optical fibers inside a buffer tube while reducing the risk of damaging the fibers, as sometimes occurs when cutting the outer layer of the buffer tube.

DISCUSSION OF RELATED ART

Optical fiber cables have been used for many years to transmit information at high rates and very long distances. The transmission medium of the optical fiber cable are delicate optical fibers. Ordinarily, these optical fibers reside in a buffer tube or in a core tube. Hereinafter, for the sake of simplicity, buffer tubes shall also include core tubes. The buffer tube protects the optical fibers residing therein. The buffer tube may be fabricated from a single material or from a combination of two or more materials.

In many fiber optic cable designs, it is desirable to have a buffer tube made from a material with a high Young's modulus. The use of a material with a high Young's modulus results in a cable with a buffer or core tube having relatively high tensile and compressive resistance capability, a trait useful in protecting the optical fibers in the event the cable is twisted, stretched or compressed. Also, it is important to select a material for the buffer tube that has a low thermal expansion coefficient. Too much shrinkage or expansion of the buffer tube caused by temperature changes could place tensile or compressive loads on the optical fibers residing therein. High tensile or compressive loads can result in damaged or broken optical fibers.

Known buffer tube designs, either single- or multi-layer, have an additional disadvantage in the difficulty of accessing the optical fibers mid-span. This problem is exacerbated by the recent tendency in optical fiber design to pack greater numbers of optical fibers into smaller buffer tubes. As the fiber density inside tubes increases, free space inside the tubes decreases, and it is more likely to damage optical fibers when a buffer tube is opened with a cutting tool.

Cutting tools for mid-span access of buffer tubes are typically designed so that the blades cut just through the buffer tube wall and extend only a limited distance into the tube cavity. The purpose of making a tool with a carefully controlled depth of cut is to achieve access into the buffer tube with minimum fiber damage. In fact, some recent tools are designed so that the blades cut only partially through the tube wall. The tube is then stressed by hand or with a tool such that the remaining portion of the wall is broken. However, this procedure may be difficult, because buffer tube materials typically do not break readily in order to meet the design constraints discussed above.

Therefore, an improved buffer tube is sought that allows for efficient access to mid-span inner optical fibers without damage to the fiber, and yet satisfies the structural constraints necessary for buffer tube walls.

SUMMARY OF THE INVENTION

The present invention is designed to overcome the limitations that are attendant upon the use of the prior art buffer tubes and mid-span fiber accessing techniques. The present invention therefore offers a buffer tube design which has improved access to mid-span fibers, high strength, and low cost. This is achieved by creating a two-layer buffer tube with an inner layer that is notch-sensitive, and an outer layer that has much lower notch-sensitivity and higher strength relative to the inner layer.

Notch-sensitivity, as will be understood by one skilled in the art, is a property of a material that relates to the ease with which a cut, or notch, when made in the material, continues to propagate through the material. When a notch is cut in a highly notch sensitive material, it will propagate through the material with little or no physical intervention by the user.

A negative relationship exists between notch sensitivity and the exertion required to propagate a cut. A material having a gradient of notch sensitivity, whereby notch sensitivity increases towards the center, will require less exertion to propagate a cut towards the center relative to the outside of the material.

According to another aspect of the invention, the buffer tube wall may comprise a single layer with notch-sensitivity increasing towards the inside surface of the buffer tube wall. One embodiment of this invention includes a cellular, or foamed, polymer material with higher cell density towards the inner surface of the buffer tube wall.

A cutting tool containing blades is used to cut the outer (less notch-sensitive) portion of the buffer tube. The inner portion of the buffer tube is then split open with little effort due to the high notch-sensitivity of the inner portion of the buffer tube. Thus, it is possible to greatly reduce the risk of damaging the optical fibers when accessing mid-span optical fibers.

The invention will be more fully understood when reference is made to the following detailed description taken in conjunction with the accompanying drawings.

BRIEF DESCRIPTION OF THE DRAWINGS

The drawings, not drawn to scale, include.

DETAILED DESCRIPTION OF THE PRESENT INVENTION

Figure 1:
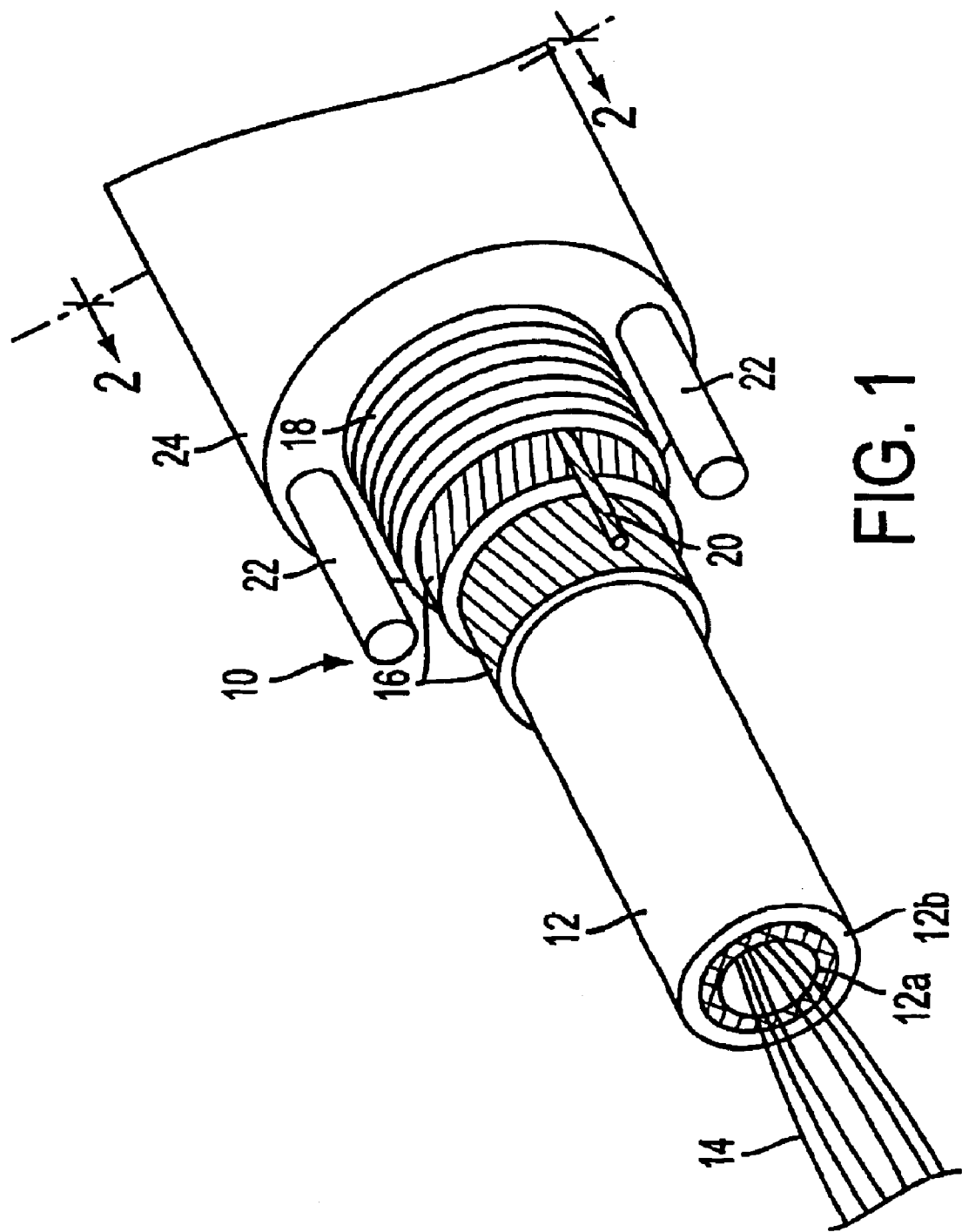
FIG. 1, which is a perspective cutaway section of an optical fiber cable made with the buffer tube of the present invention.

The present invention, according to the first embodiment, contemplates a buffer tube with a dual layer buffer tube wall. The inner layer, which is closest to the optical fibers, is more notch-sensitive than the outer layer. It is intended that a cut be made through the entire outer layer, but only partially into the inner layer. Because of its relatively high notch-sensitivity, the cut in the inner layer easily propagates through the inner layer so that the optical fiber contents of the buffer tube are easily exposed. The outer buffer tube layer surrounds the outside of the inner buffer tube layer and provides much of the structural and barrier properties typically required by buffer tube walls.

In a preferred embodiment, dual layer extrusion is used to manufacture a dual layer buffer tube having inner and outer layers. The outer layer may be a material conventionally used for buffer tube walls, such as polybutylene terephtalate. The inner layer may be made from a material having a relatively high notch sensitivity, such as a thermoplastic elastomer or soft polyolefin that is notch-sensitive.

The outer buffer tube wall of the dual layer embodiment of the present invention may be made from any of a number of conventional materials. Materials typically used for making buffer tubes for buffering optical fibers in a telecommunications cable include plasticized polyvinyl chloride (PVC), polybutylene terephtalate (PBT), polycarbonate (PC), polyamide such as Nylon-12, and various polyolefins, for example. These and other suitable examples are described in detail in the following U.S. Pat. Nos. 6,215,931, 5,574,816, and 5,911,023.

The inner buffer tube wall should have a higher notch-sensitivity than the outer wall. Examples of suitable materials for the inner portion include thermoplastic elastomers and flexible, or soft, polyolefins, optionally including fillers such as talc. Other fillers which may be used include, for example, organic or inorganic fillers such as calcium carbonate, carbon black, aluminum tri-hydride, magnesium hydroxide, or other fillers which may control physical properties such as coefficient of thermal expansion, modulus of elasticity, elongation to break, and flame retardancy.

According to another embodiment, one or more layers of the buffer tube can be made by extruding a tube from a polymer optionally having a nucleating agent incorporated therein. Examples of nucleating agents include inorganic materials, salts of aliphatic monobasic or dibasic acids, aralkyl acids, or alkali metal or aluminum salts of aromatic or alicyclic carboxylic acids. At least one of the layers of the dual-layer buffer tube may be fabricated, for instance, by co-extrusion of a copolymer of polypropylene-polyethylene having a nucleating agent distributed therein. The amount of nucleating agent is preferably in the range of approximately 0.05 to 2.0 weight percent. The nucleating agent enables the extruded polymer, polypropylene-polyethylene copolymer in this example, to crystallize at a substantially faster rate than a non-nucleated polyethylene-polypropylene copolymer. The faster crystallization rate "locks in" the crystalline structure of the polypropylene-polyethylene, which in turn, reduces the post-extrusion shrinkage of the polyproylene-polyethylene layer of the multi-layer buffer tube. The use of nucleating agents in this context is set forth in U.S. Pat. No. 6,066,397.

Materials such as talc, glass fiber, glass spheres, for example, may also be added as filler materials to a nucleated polymer prior to extrusion of a buffer tube to further modify the physical properties such as strength, shrinkage, and flexibility of the resulting extruded tube.

According to another preferred embodiment, the buffer tube of the present invention may have a tube wall made of a foamed polymer. Foamed polymers and the process for foaming polymers are described in U.S. Pat. No. 6,066,397. A buffer tube of this embodiment may be made, for example, of a foamed polyethylene, foamed polypropylene, foamed polypropylene copolymer, or foamed mixtures containing two or more of polyethylene, polystyrene, and polypropylene. To achieve the relatively high notch sensitivity of the inner portion of the tube wall compared to the outer portion, the inner portion is more cellular, i.e., less dense, than the outer portion. The density of the foamed material comprising the inner portion may be reduced to about 30% of the density of the material prior to foaming. In foaming process involving supercritical fluids, the material may be foamed to a density of 10% of the density of the material prior to foaming. An example of the density range over the width of the buffer tube wall for a representative embodiment would be from about 0.99 g/cc for the outside portion, to about 0.4 g/cc for the inner portion of the buffer tube wall.

One embodiment of the present invention utilizing a foamed polymer employs a dual-layer buffer tube having a cellular inner layer, and a non-cellular outer layer. One such cellular material is cellular (foamed) impact modified, nucleated polypropylene (i.e., nucleated ethylene-propylene copolymer). This and similar materials may be made according to the following process.

A polymer, preferably a homopolymer, copolymer, or terpolymer of polypropylene, or a blend of polymers containing polypropylene, is fed into an extruder, which mixes and melts the polymer. A chemical or physical blowing agent may be added to promote foaming. If a chemical blowing agent is used it can be metered in during final extrusion or compounded into the upjacket material prior to the final extrusion step. If pre-compounded material is used a suitable chemical blowing agent should be used so that the material can be compounded at a temperature low enough so that the blowing agent does not activate during initial compounding, but subsequent processing at a slightly higher temperature promotes foaming. Suitable chemical blowing agents may include azodicarbonamides, semicarbazides, and hydrazides. While chemical blowing agents may be advantageous, physical blowing agents, such as supercritical fluid blowing agents or pressurized gas, may provide the benefit of uniform microcellular foam structure. Examples of physical blowing agents that may be used are supercritical carbon dioxide, high pressure nitrogen gas, or any other suitable supercritical fluid or pressurized gas.

The materials to be foamed are mixed and then flow into the crosshead, which diverts the flow and forms the molten material into its tubular cross section. When the extruded melt is exposed to lower pressure, dissolved gases produced by the physical or chemical blowing agents come out of solution as gas bubbles, nucleate, and grow. The process of bubble nucleation and growth results in a cellular, or foam, material. The extruder is preferably a 24:1 to 30:1 L/D ratio with preferably a 1½" to 3" screw diameter. Processing temperatures may follow an extruder profile similar to the following:

| Zone 1 | Zone 2 | Zone 3 | Zone 4 | Zone 5 | Head | Die |
|--------|--------|--------|--------|--------|------|-----|
| 350° F. | 380° F. | 400° F. | 420° F. | 420° F. | 420° F. | 400° F. |

However, as the blowing agent and polymer materials may be varied, as well as the extruder itself, one of ordinary skill would recognize that the extruder temperature profiles may vary considerably from the preferred embodiment. The present preferred embodiment may have different extruder temperature profiles depending on various flow rates and pressures.

The payoff, takeup, and capstans manage the extruded tube, ensuring that the extruded buffer tube is pulled away at a constant velocity and tension. The cellular buffer tube material is then cooled, for instance in a water trough. The result is a cellular buffer tube wall material.

The polymer used to make the cellular buffer tube wall material may also be polyethylene. Any foamable polymer material may be used in the present invention, so long as it demonstrates adequate physical properties. For instance, if the buffer tube will be exposed to heat, expansion and contraction of the tube material is a concern. In this instance, high density polyethylene ("HDPE") may be preferred to medium density polyethylene ("MDPE") or linear low density polyethylene ("LLDPE"), due to the more favorable coefficient of thermal expansion. Nucleated impact polypropylene is the most preferred because it demonstrates an even lower coefficient of thermal expansion ("CTE"). As a result of having a lower CTE, the material will expand and contract less than LLDPE, MDPE, or HDPE. Various coefficients of thermal expansion (1/° C. at 23° C.) are as follows:

| | |
|---|---|
| Nucleated Impact Polypropylene | $6 \times 10^{-5}$ |
| Polyethylene | $1.1–1.8 \times 10^{-4}$ |

Therefore polypropylene may be a preferred polymer for fabricating the cellular inner buffer tube layer of the present invention, although other polymers, such as polyethylene, polyurethane, polystyrene, and virtually any foamable polymer or polymer blend, copolymer, or terpolymer may be used to make a cellular inner buffer tube wall, as one of ordinary skill would appreciate.

FIG. 1 illustrates an example of optical fiber cable, in which the novel buffer tube design of the present invention is incorporated. Specifically, there is an optical fiber cable as identified by numeral 10. More specifically, this cable structure 10 has a, gel-filled buffer or core tube 12 having an inner notch-sensitive layer 12a and an outer layer 12b with a low notch sensitivity relative to the inner layer. As discussed above, examples of suitable materials for the inner layer 12a include flexible, or soft, polyolefins, optionally including fillers such as talc. Other fillers which may be used include, for example, organic or inorganic fillers such as calcium carbonate, carbon black, aluminum tri-hydride, magnesium hydroxide, or other fillers which may control physical properties such as coefficient of thermal expansion, modulus of elasticity, elongation to break, and flame retardancy.

The outer layer 12b of the buffer tube may be made from a material such as a high modulus, nucleated impact polypropylene copolymer. Other suitable materials include plasticized polyvinyl chloride (PVC), polybutylene terephtalate (PBT), polycarbonate (PC), polyamide such as Nylon-12, and various polyolefins, for example Although not critical to the invention, a gel may be provided in the buffer tube. For example, a gel may be provided which is thixotropic and water-blockable, such as a mineral gel or petroleum gel. The gel-filled buffer tube 12 contains a plurality of optical fibers 14. Radial strength yarns 16 made of either aramid, polyethylene, polyester or fiberglass materials are contra-helically stranded around the buffer tube 12 and impregnated with filling compound such as a petroleum based hot melt filling compound. Corrugated steel armor 18 may be applied over the radial strength yarns 16 and the corrugated steel armor 18 may be flooded with a water-blockable flooding compound (not shown) such as petroleum-based hot melt filling compound manufactured by Witco Corporation, New York, N.Y. or Amoco Chemical Company, Chicago, or a petroleum-based flooding compound. A high strength rip cord 20 may be applied under the armor 18 to aid with sheath removal. Two strength members 22 are located 180 degrees apart on the outside of the corrugated armor 18. The strength members 22 may be fabricated from steel or fiber-reinforced plastics. An outer jacket 24, made of, for instance, medium-density polyethylene (MDPE), encapsulates the strength members 22 and corrugated armor 18 to complete the structure. The water blockable flooding compound is disposed between the corrugated armor 18 and the outer jacket 24.

The embodiment discussed above merely provides an example of an optical fiber cable structure with the buffer tube for which the present invention may be used. It will be appreciated by those skilled in the art that the present invention may be varied.

For instance, according to an alternative embodiment, the buffer tube has a single wall in which the notch sensitivity increases from the outer portion to the inner portion. For example, when using a cellular material there is a cell density gradient across the buffer tube wall, whereby the outermost portion of the buffer tube wall has very little cellular character and the inner portion is highly cellular. This embodiment of the invention may be accomplished by extruding a single tube with increased nucleation towards the inner tube wall. The inner portion of the resulting buffer tube is more cellular than the outer portion. This results in a higher notch-sensitivity towards the inner portion of the tube wall.

The present buffer tube can be made by extruding a tube from a polymer having a nucleating agent incorporated therein. The cell density across the buffer tube wall can be accomplished, for example, by adding a nucleating agent in a gradient corresponding to the intended cell density gradient. Examples of nucleating agents include inorganic materials, salts of aliphatic monobasic or dibasic acids, aralkyl acids, or alkali metal or aluminum salts of aromatic or alicyclic carboxylic acids. The nucleating agent enables the extruded polymer, polypropylene-polyethylene copolymer in this example, to crystallize at a substantially faster rate than a non-nucleated polyethylene-polypropylene copolymer. Other methods may be used to achieve a cell density gradient across the buffer tube wall, such as using a specific extruder tooling, extruding the material with a differential temperature, or inserting a blowing agent such that blowing agent concentration increases towards the inner portion of the tube wall.

Figure 2:
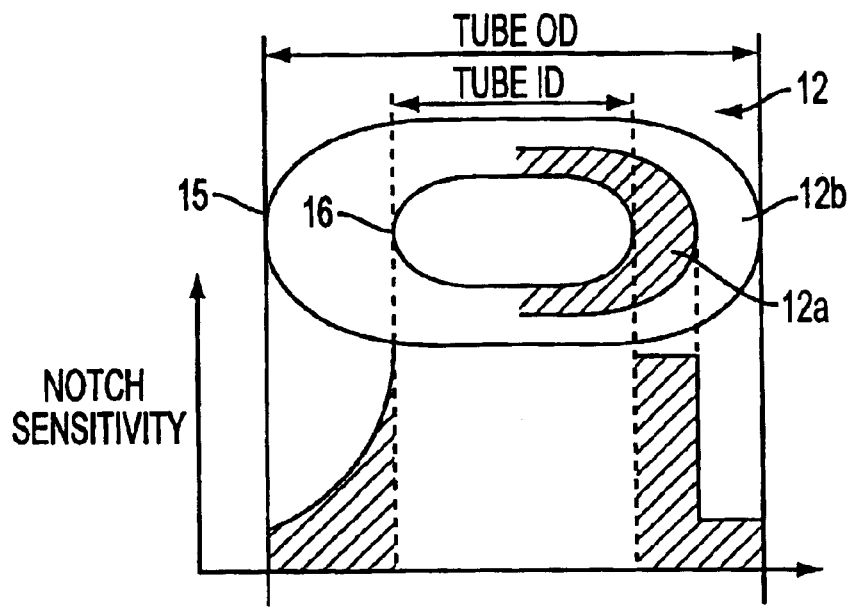
FIG. 2, which is a notch-sensitivity chart showing the notch-sensitivity profile of a buffer tube according to two embodiments of the present invention.

FIG. 2, is a chart showing the notch-sensitivity profile of the buffer tube walls corresponding to two embodiments of the present invention.

The right profile corresponds to a previously discussed embodiment in FIG. 1, where two separate layers, including notch-sensitive inner layer 12a and an outer layer 12b with a lower notch-sensitivity relative to the inner layer 12a, are used to form the buffer tube wall. The different notch sensitivities of the two layers are indicated by the notch-sensitivity profile, which is a step-function.

In the left profile, notch-sensitivity continuously increases from the outside surface of the tube wall 15 towards the inside surface 16 of the tube wall, as discussed above. Thus, the buffer type in this embodiment includes a single layer with a relatively high notch-sensitivity towards the inner surface 16 of the buffer tube wall, which, in one embodiment corresponds to a high cell density of the foamed polymer. As shown by the left profile, the outer surface of the buffer tube wall 15 has a lower notch-sensitivity relative to the buffer tube wall near the inner surface, corresponding to a region having low cell density.

Figure 3:
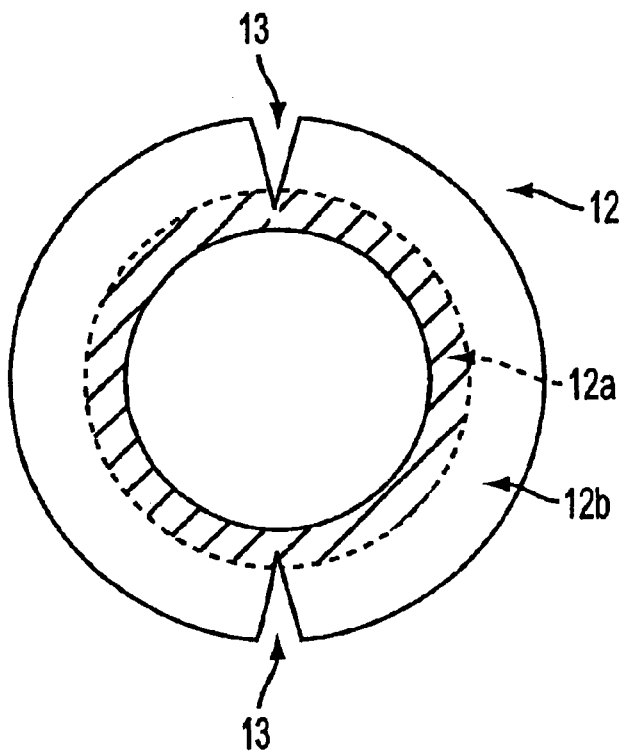
FIG. 3, which is a cross-sectional view of a buffer tube according to the present invention which has been cut in the manner described herein so that the outer buffer tube wall is cut completely through, but the inner buffer tube wall is only partially cut.

FIG. 3 illustrates the incision contemplated by the present invention that would allow access to the optical fibers within. A cut 13 is made completely through the outer layer 12b. The cut 13 extends only a small distance into the inner, notch-sensitive layer 12a. Because of the notch-sensitivity of inner layer 12a, once the cut is made, the cut may easily be caused to propagate throughout the inner notch-sensitive layer 12a, thereby exposing the contents of the buffer tube without risking cutting the optical fibers.

Similarly, it is contemplated that with the single layer buffer tube, a cut would be made partially into the layer, whereupon it may easily be caused to propagate through the remainder of the layer.

Of course, it will be appreciated by those skilled in the art that variations on the above mentioned starting materials, tooling and processing parameters can be made without deviating from the spirit and scope of the present invention.

Generally, the compression resistance of buffer tubes made according to the present invention can be determined using the procedures set forth in ASTM D695-90. A further discussion of compression resistance testing may also be found in an article by P. E. Neveux and W. H. Hatton entitled "Designing Compression Resistance in Loose Tube Cables" published in the International Wire and Cable Symposium Proceedings, 1987, pages 656 through 661.

It is contemplated by the present invention that any materials known to be useful in the fabrication of a layer of multi-layer buffer tubes may be used as a layer in combination with a second layer made according to the present invention, so long as the buffer tube wall exhibits a notch-sensitivity near the inside of the buffer tube wall that is high relative to the outer portion of the buffer tube wall. Thus, it can be seen from the foregoing specification and attached drawings that the present invention provides an effective buffer tube for housing optical fiber transmission media and an effective method for making the same. The buffer tube and method of making it represent a substantial improvement over the prior art. As compared to the prior art, the buffer tubes made according to the present invention provide a buffer tube that is easier to access without causing fiber damage or attenuation. The embodiments disclosed herein admirably achieve the objects of the present invention; however, it should be appreciated by those skilled in the art that departures can be made by those skilled in the art without departing from the spirit and scope of the invention which is limited only by the following claims.

What is claimed is:

1. A buffer tube for use in a fiber optic cable, the buffer tube comprising:
   a tube having a tube wall, the wall having an inside and outside surface;
   wherein an inner portion of tube wall, nearest the inside surface, is made of a material having a higher notch-sensitivity than an outer portion of the tube wall nearest the outside surface.

2. The buffer tube of claim 1, wherein the tube wall is formed from a nucleated impact polypropylene copolymer.

3. The buffer tube of claim 1, wherein the tube wall is made of a foamed polymer.

4. The buffer tube of claim 1, wherein the tube wall is made of a foamed polymer, wherein the polymer is a member selected from the group consisting of polypropylene, polystyrene, polyethylene, polypropylene copolymer, polystyrene-polypropylene copolymer, and polystyrene copolomer.

5. The buffer tube of claim 1, wherein the tube wall is made of a foamed polymer, wherein the tube wall nearest the inside surface has a high cell density relative to the cell density of the tube wall nearest the outside surface of the tube wall.

6. The buffer tube of claim 1, wherein the tube wall comprises two layers: an inner layer, corresponding to the inner portion; and an outer layer, corresponding to the outer portion and surrounding the inner layer; wherein the inner layer has a higher notch-sensitivity relative to the outer layer.

7. The buffer tube of claim 6, wherein the inner layer is formed from a polyolefin, and the outer layer is formed from a nucleated impact polypropylene copolymer.

8. A method for making a buffer tube with improved access to mid-span optical fibers comprising the steps of:
   a. providing a buffer tube for use in a fiber optic cable, the buffer tube comprising:
      a tube having a tube wall, the wall having an inside and outside surface;
      wherein the tube wall nearest the inside surface is made of a material having a higher notch-sensitivity than the tube wall nearest the outside surface;
   b. making a notch in the tube wall, wherein the notch extends only partially through the tube wall; and
   c. splitting open the remaining portion of the buffer wall tube by hand, thereby exposing the contents of the tube.

9. The method of claim 8, further comprising the step of using a tool to make a notch in a portion of the tube having a lower notch sensitivity, wherein the notch does not extend completely through the tube wall.

10. A buffer tube for use in fiber optic cable comprising:
    a tube having a tube wall, the wall having an inside and outside surface; and
    means for accessing fibers inside the tube by cutting only part of the tube wall.

11. A fiber optic cable comprising:
    one or more buffer tubes, each buffer tube containing one or more optical fibers; a rigid strength member located outside the buffer tube(s) and a cable jacket surrounding the buffer tube(s),
    wherein at least one buffer tube comprises a tube having a tube wall, the wall having an inside and outside surface;
    wherein an inner portion of tube wall, nearest the inside surface, is made of a material having a higher notch-sensitivity than an outer portion of the tube wall nearest the outside surface.

12. The fiber optic cable of claim 11, wherein the tube wall is formed from a nucleated impact polypropylene copolymer.

13. The fiber optic cable of claim 11, wherein the tube wall is made of a foamed polymer.

14. The fiber optic cable of claim 11, wherein the tube wall is made of a foamed polymer, wherein the polymer is a member selected from the group consisting of polypropylene, polystyrene, polyethylene, polypropylene copolymer, polystyrene-polypropylene copolymer, and polystyrene copolomer.

15. The fiber optic cable of claim 11, wherein the tube wall is made of a foamed polymer, wherein the polymer is a member selected from the group consisting of polypropylene, polystyrene, polyethylene, polypropylene copolymer, polystyrene-polypropylene copolymer, and polystyrene copolomer; the tube wall nearest the inside surface having a high cell density relative to the cell density of the tube wall nearest the outside surface of the tube wall.

16. The fiber optic cable of claim 11, wherein the tube wall comprises two layers: an inner layer, corresponding to the inner portion; and an outer layer, corresponding to the outer portion and surrounding the inner layer; wherein the inner layer has a higher notch-sensitivity relative to the outer layer.

17. The fiber optic cable of claim 16, wherein the inner layer is formed from a polyolefin, and the outer layer is formed from a nucleated impact polypropylene copolymer.

* * * * *